United States Patent [19]

Laidig et al.

[11] E Re. 28,991

[45] Reissued Oct. 5, 1976

[54] BOTTOM SILO UNLOADER

[75] Inventors: Jonathan J. Laidig, Mishawaka, Ind.; Loren P. Boppart, Harvard, Ill.

[73] Assignee: Laidig Silo Unloaders, Inc., Mishawaka, Ind.

[22] Filed: Sept. 22, 1975

[21] Appl. No.: 615,505

Related U.S. Patent Documents

Reissue of:

[64] Patent No.: 3,851,774
Issued: Dec. 3, 1974
Appl. No.: 421,855
Filed: Dec. 5, 1973

[52] U.S. Cl. ..... 214/17 DA
[51] Int. Cl.[2] ..... B65G 65/46
[58] Field of Search ..... 214/17 D, 17 DA, 17 DB; 222/404

[56] References Cited

UNITED STATES PATENTS 2,635,770 4/1953 Tiedemann ..... 214/17 DA
2,675,931 4/1954 Makous ..... 214/17 DA

*Primary Examiner*—Robert G. Sheridan
*Attorney, Agent, or Firm*—Johnson, Dienner, Emrich & Wagner

[57] ABSTRACT

A bottom silo unloader for use in discharging moist grain from a sealed silo has a discharge tube set in the silo floor that leads from a casing in the center of the silo below floor level to the outside, and a discharge auger in the casing is driven by drive means adjacent the outer end of the tube. A pair of vertically aligned, right angle gear boxes are driven by the discharge auger and drive a sweep auger. A ring gear on which the upper gear box is mounted is rotated from the drive means to cause the sweep auger to rotate about the vertical axis of the silo and the gear boxes. A torsion arrangement suspends rotation of the ring gear when the sweep auger encounters heavy resistance to its movement around the silo.

14 Claims, 9 Drawing Figures

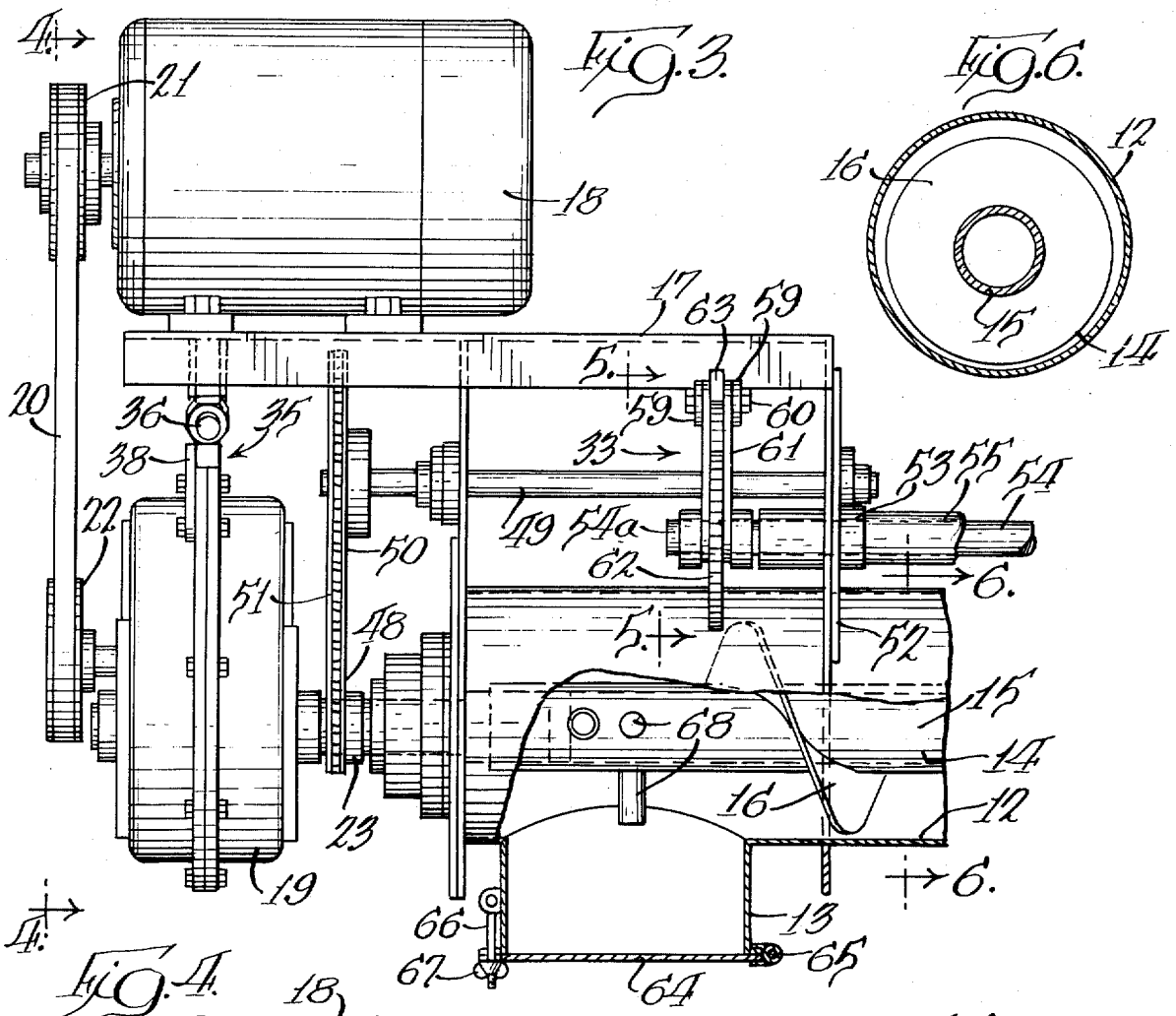
Fig. 3.
Fig. 6.
4.
21
18
17
63
59
5.
59
60
33
61
36
35
38
20
22
50
51
48
49
54a
62
53
55
54
6.
52
15
68
14
16
12
23
19
66
13
67
65
64
16
12
14
45
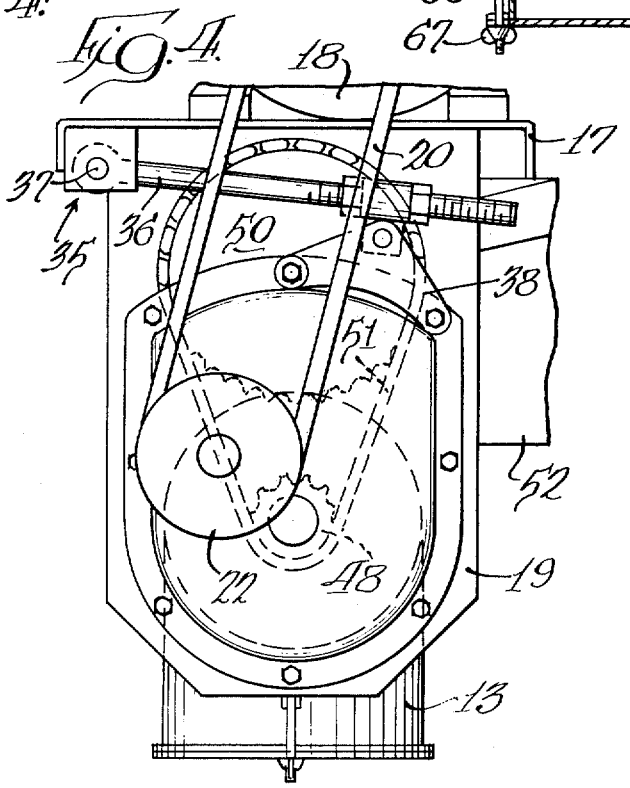
Fig. 4.
18
17
20
37
36
35
50
38
51
52
22
48
19
13
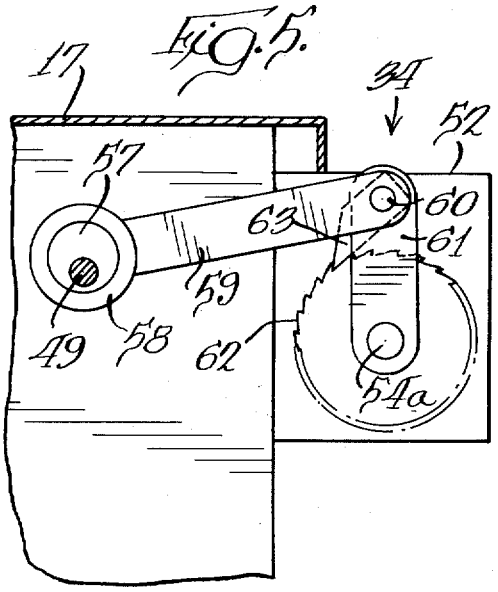
Fig. 5.
17
34
52
57
60
63
61
59
49
58
62
54a

BOTTOM SILO UNLOADER

Matter enclosed in heavy brackets [ ] appears in the original patent but forms no part of this reissue specification; matter printed in italics indicates the additions made by reissue.

BACKGROUND OF THE INVENTION

The oxygen-controlled storage of animal feeds in sealed silos requires that the silage be unloaded from the bottom of the silo. Generally, bottom silo unloaders have a sweep member which rotates about the vertical axis of the silo to move stored material to a center discharge opening through which it drops into another conveyor means that is either in or beneath the floor, that carries the material to the exterior of the silo. The material discharge opening from the discharge conveyor means is provided with a sealed closure.

When a silo is used for the storage of relatively fine, granular material such as shelled corn, the material handling problems are very different from those which exist in the handling of materials such as chopped corn silage and haylage; and as a result the apparatus for discharging grain requires different characteristics from what is needed in an apparatus to discharge chopped corn silage or haylage. Most of the commercial grain unloaders now on the market for use with shelled corn depend upon gravity to unload the grain until it reaches its angle of repose, after which a sweep arm is made operative to remove the remaining grain. Because of this, there are limitations on the maximum moisture content and minimum particle size to insure free flow of the material. The moisture maximum is about 30 percent, and the shelled corn must have been very carefully handled so as to have very few broken kernels. If these requirements are not met, the material may become non-free-flowing, which makes it difficult to remove the material from the silo.

There is a definite need for a mechanically simple, rugged bottom silo unloader which can be readily serviced and maintained by a farmer, and which is capable of handling shelled corn of high moisture content or shelled corn which has been cracked or split, whether such cracked or split corn is of a low or high moisture content.

SUMMARY OF THE INVENTION

In accordance with the present invention, a center discharge hole in the floor of a sealed storage silo is provided with a casing that is set in the floor, and a discharge tube extends from the interior of the casing to a point outside the silo wall. A discharge auger mounted in the discharge tube is driven from a motor and reduction gear box that are mounted on the tube outside the silo wall, with the auger shaft being coupled directly to the output shaft of the gear box.

In the casing at the center of the silo floor are two vertically aligned, right angle gear boxes. The lower gear box has a horizontal input shaft directly coupled to the inner end of the discharge auger, and a vertical shaft on the axis of the silo connects the lower gear box output with the upper gear box input. The upper gear box output shaft is directly coupled to the shaft of a sweep auger so the sweep auger is driven by the motor through the discharge auger.

In order to rotate the sweep auger about the axis of the silo, there is a horizontally disposed ring gear that is rotatable in the casing, and the upper gear box is mounted on the ring gear so as to rotate with it. Drive of the ring gear is taken off the output shaft of the reduction gear unit that drives the discharge auger, with the drive being through a ratchet and pawl arrangement and a long ratchet shaft that extends from outside the silo into the casing where it has a worm in driving engagement with the ring gear.

A satisfactory apparatus for discharging high moisture content shelled corn from a sealed silo must be capable of responding to differences in the density of the material through which it sweep auger passes. In the present arrangement, if the sweep auger encounters an area of high resistance in the material to be discharged, the heavy load on the long ratchet shaft causes it to distort in torsion and put a reverse load upon the ratchet. Under these conditions, when the pawl is disengaged from the ratchet for backward movement to pick up another ratchet tooth, the torsion loading of the ratchet shaft causes the ratchet to back up with the pawl and thus suspends rotation of the ring gear. The suspended ring gear action continues until the sweep auger has removed enough of the packed material to reduce the resistance to movement of the sweep auger around the silo sufficiently that the ratchet and pawl is again effective to rotate the ring gear.

In addition to the foregoing structural and operational features, the present apparatus includes novel means for deliverying material from the side of the casing away from the discharge auger into the discharge auger for removal from the silo. When the sweep auger is in that portion of the silo which is most remote from the discharge auger, it feeds material into the side of the casing which is away from the discharge auger, and this material is moved into the discharge auger by a pair of radially extending paddles on the vertical shaft that connects the upper and lower gear boxes.

THE DRAWINGS

FIG. 3 is a fragmentary side elevational view on an enlarged scale with parts broken away, taken substantially as indicated along the line 3—3 of FIG. 2;

FIG. 4 is a fragmentary end elevational view taken substantially as indicated along the line 4—4 of FIG. 3;

FIG. 5 is a fragmentary sectional view taken substantially as indicated along the line 5—5 of FIG. 3;

FIG. 6 is a sectional view taken substantially as indicated along the line 6—6 of FIG. 3;

DETAILED DESCRIPTION OF THE INVENTION

Figure 1:
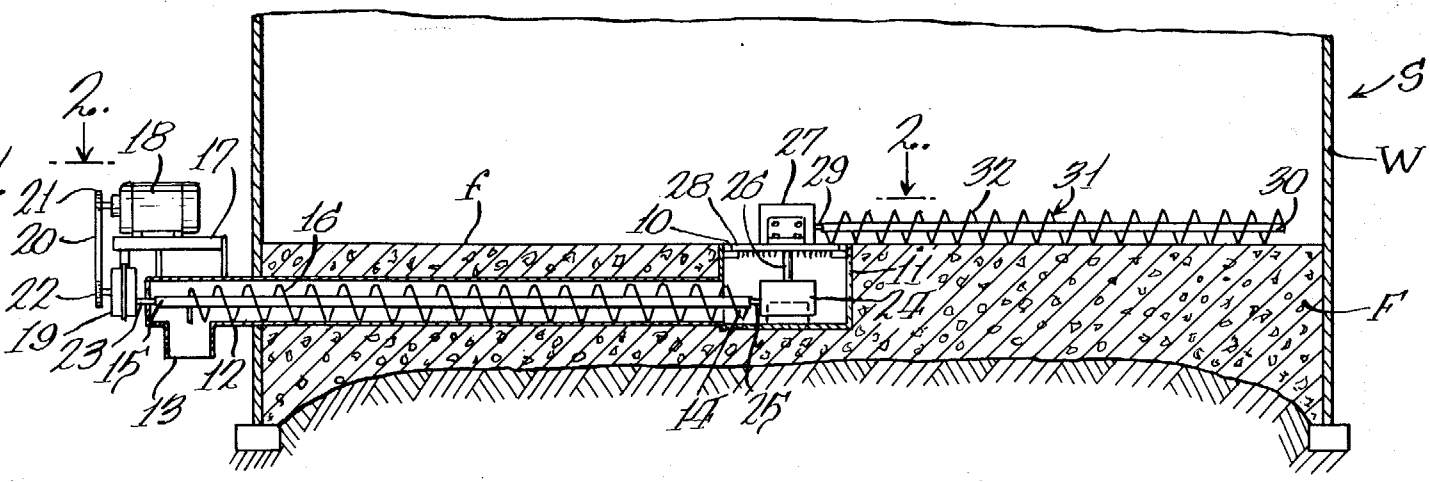
FIG. 1 is a generally schematic view through the foundation and the lower end portion of a silo provided with the material discharge apparatus of the invention.

Referring to the drawings in detail, and referring first to FIG. 1, a silo, indicated generally at S has a concrete foundation F with a horizontal top surface providing a floor f; and a continuous silo wall W surrounds the foundation and extends upwardly. The upper end (not shown) of the silo is closed by a sealed roof and is provided with any suitable breather structure for preventing air from coming into contact with material stored in the silo while at the same time permitting expansion and contraction of air in the top of the silo as the ambient temperature changes.

At the center of the silo floor is a discharge opening 10 in which a casing 11 is positioned in the foundation, and from a hole in one side of the casing 11 a discharge tube 12 which is embedded in the foundation F extends outside the silo where it is provided with a discharge opening 13. A discharge auger 14, mounted in the discharge tube 12, includes an auger shaft 15 and a helix 16.

Mounted on the projecting outer end portion of the discharge tube 12 is a motor mounting platform 17 on which an electric motor 18 is supported, and suspended from the platform 17 is a reduction gear unit 19 which is driven from the motor 18 by a drive belt 20 that is trained around a motor sheave 21 and an input sheave 22 on the input shaft of the reduction gear unit 19. An output shaft 23 of the unit 19 is directly coupled to the discharge auger shaft 15.

In the casing 11 is a lower right angle gear box 24 that has an input shaft 25 directly coupled to the discharge auger shaft 14; and a vertical shaft 26 which is on the vertical axis of the silo connects the lower right angle gear box 24 with an upper right angle gear box 27 which is carried on a horizontal ring gear 28 that is mounted in the top of the casing 11 for rotation about the axis of the vertical shaft 26. The upper right angle gear box 27 has an output shaft 29 which is directly coupled to a sweep auger shaft 30 of a sweep auger 31 that has a helix 32 resting upon the floor f of the silo. The ring gear 28 is rotated by a ring finger gear drive means, indicated generally at 33 (FIGS. 2 to 5) which includes an intermittent motion device, indicated generally at 34 in FIG. 5. The ring gear drive will be described in more detail hereafter. Rotation of the ring gear on which the upper right angle gear box 27 is mounted rotates the sweep auger 31 around the silo as the unloader operates so as to progressively bring the sweep auger helix 32 into contact with different parts of the material in the bottom of the silo and feed the material into the casing 11 for removal by the discharge auger 14.

The details of the mounting for the motor 18 and reduction gear unit 19 are seen in more detail in FIGS. 3 and 4, and in particular those views show that a mounting 35 for the reduction gear unit 19 includes a rod 36 that is pivoted at 37 beneath one side of the motor platform 17, and the rod 36 is threaded at its outer end to adjustably receive a yoke 38 which carries the reduction gear unit 19 so as to maintain tension in the drive belt 20. Adjustment of the yoke 38 along the threaded rod 36 maintains the gear unit output shaft 23 in alignment with the discharge auger shaft 15 to which it is coupled.

Figure 7:
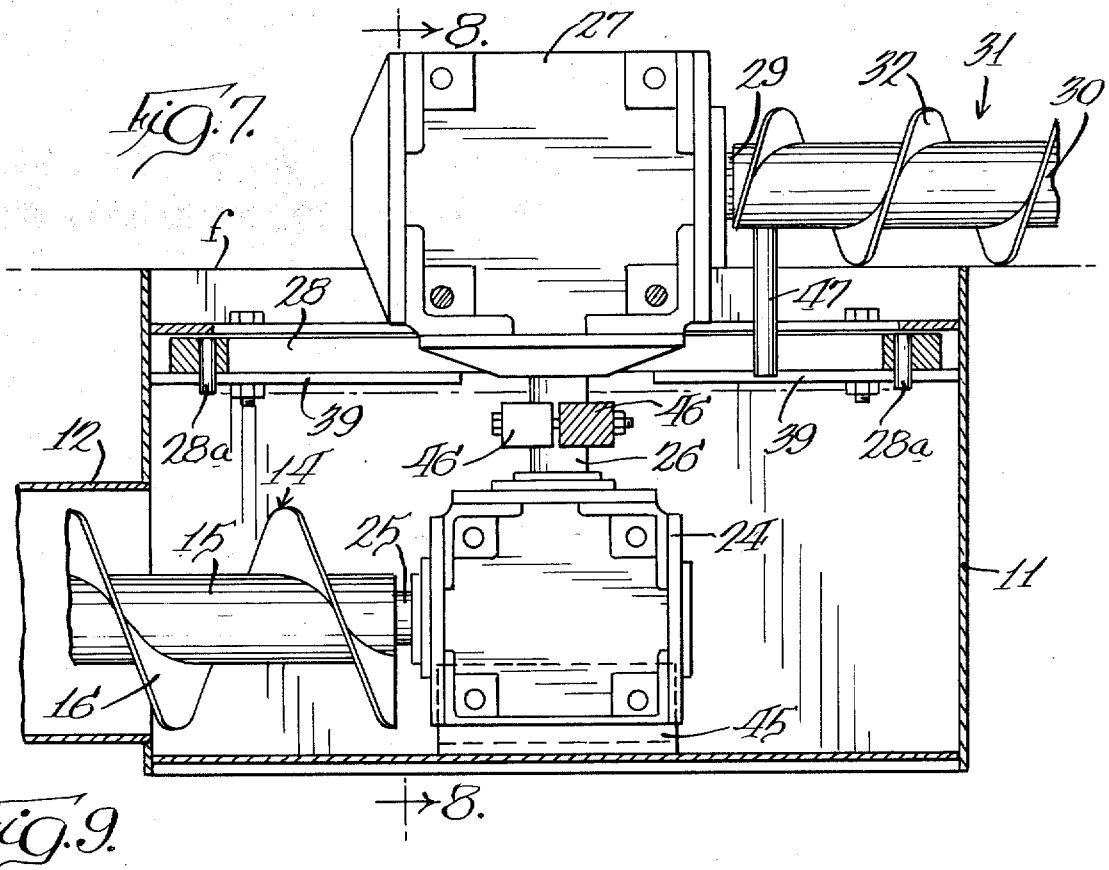
FIG. 7 is a fragmentary transverse sectional view taken substantially as indicated along the line 7—7 of FIG. 2.
Figure 9:
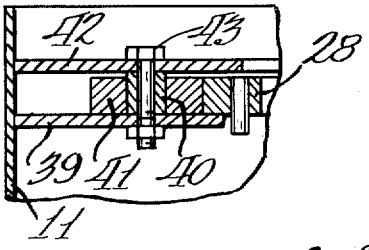
FIG. 9 is a fragmentary sectional view on an enlarged scale taken substantially as indicated along the line 9—9 of FIG. 2.
Figure 8:
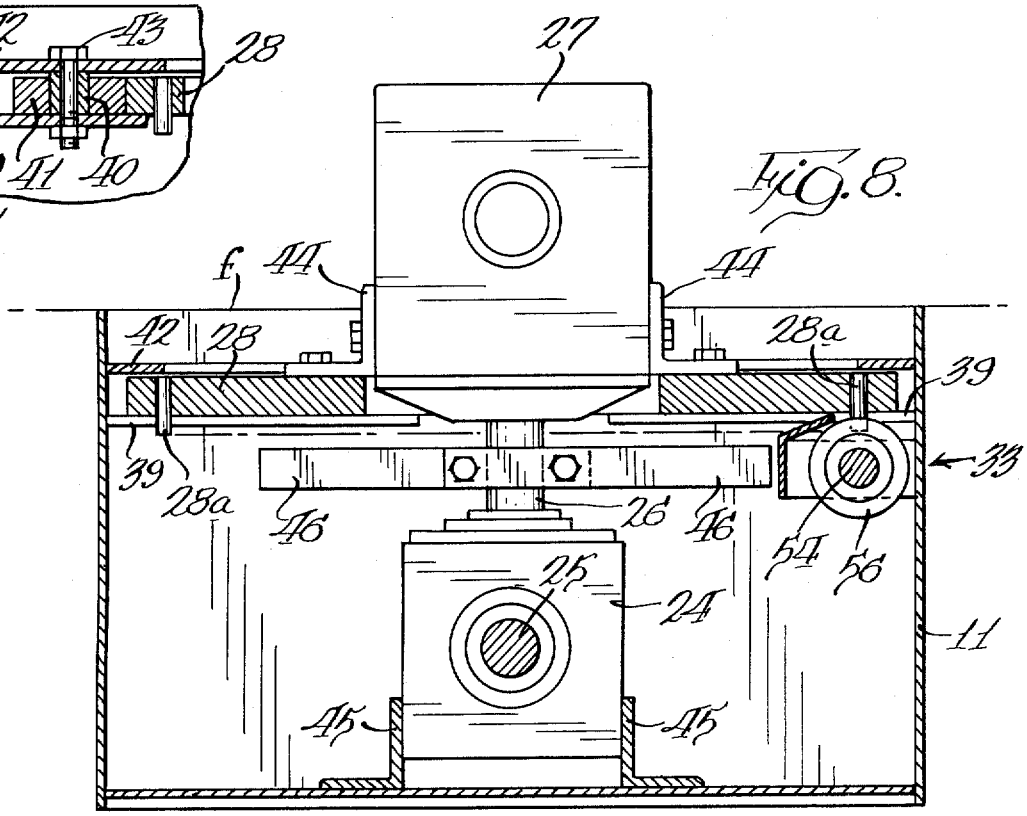
FIG. 8 is a fragmentary sectional view taken substantially as indicated along the line 8—8 of FIG. 7.

FIGS. 2 and 7 to 9 show more details of the casing 11 and of the mounting of various components in and on it. Thus, it is seen that the casing 11 is square, and in each of its corners is a flange 39 on which the periphery of the ring gear 28 is supported. Each of the flange members 39 is provided with an upright stud 40 on which a ring gear confining member 41 is journalled; and a ring gear retaining plate 42 is carried on the studs 40 and bolted to the flanges 39 by bolts 43 which extend through the studs 40 that also serve as spacers for the retaining plate 42 that hold it slightly above the ring gear 28. On opposite sides of the ring gear are angle brackets 44 which carry the upper right angle gear box 27; and as best seen in FIG. 8 the lower right angle gear box in fact is suspended from the upper gear box 27 on the shaft 26 and is confined against lateral movement by angle members 45 that are secured to the bottom of the casing 11; but the lower right angle box 24 is free to float vertically with respect to the angle members to retain proper alignment with the discharge auger shaft 15.

Mounted on the vertical shaft 26 that connects the upper and lower gear boxes are generally radially extending arms 46 which function to move material deposited in the right hand side of the casing 11 as seen in FIG. 7 into the discharge auger 14. In addition, the sweep auger 31 is provided with one or more elongated pins 47 that assist in breaking up any material that might tend to clog the feed from the inner end of the sweep auger into the casing.

Referring now particularly to FIGS. 2 to 5 and 8, the drive means 33 for the ring gear 28 includes an output sprocket 48 on the output shaft 23 of the reduction gear unit 19, and a counter shaft 49 which is journalled in the brackets that support the motor platform 17. A sprocket 50 on the counter shaft is driven by a chain 51 from the sprocket 48 so as to drive the counter shaft 49 at a substantially lower speed than the discharge auger 14.

Figure 2:
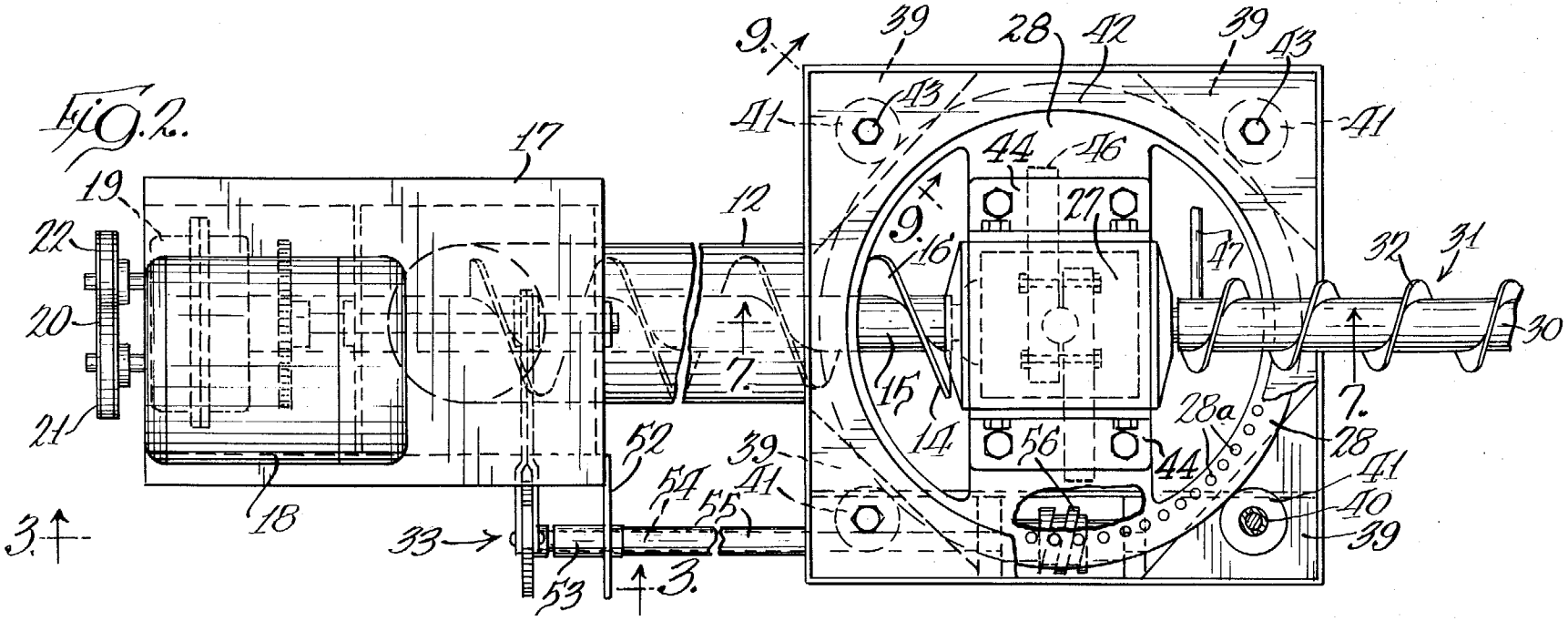
FIG. 2 is a fragmentary, broken sectional view on an enlarged scale taken substantially as indicated along the line 2—2 of FIG. 1 with the silo wall and floor omitted for clarity of illustration.

As best seen in FIGS. 2, 3 and 5, a laterally extending bracket 52 which is beneath the motor platform 17 contains a journal 53 for a long ratchet shaft 54 that is carried in a tube 55 in the foundation of the silo and extends into the casing 11 (see FIG. 8) where it has a worm 56 that is in driving engagement with equally spaced depending studs 28a of the ring gear 28. Thus, rotation of the ratchet shaft 54 causes the ring gear 28 to rotate and thus rotate the sweep auger 31 around the center of the silo.

Rotation of the ratchet shaft 54 is provided by a ratchet and pawl structure which forms the intermittent drive means 34. As best seen in FIGS. 3 and 5, the ratchet and pawl structure includes an eccentric 57 on the counter shaft 49 and a bearing 58 surrounding the eccentric. A pair of arms 59 which are integral with the bearing 58 form a crank arm, and a pivot pin 60 between the arms 59 receives a bifurcated link 61 which is journalled on the projecting outer end portion 54a of the ratchet shaft 54. A ratchet 62 is keyed to the shaft portion 54a between the halves of the bifurcated link 61, and a pawl 63 is pivoted on the pivot 60 so as to engage the teeth of the ratchet 62 as illustrated in FIG. 5.

In operation, the eccentric movement of the member 57, transmitted through the crank arm 59, causes the pawl 63 to oscillate transversely as seen in FIG. 5 and successively pick up the teeth of the ratchet 62 to impart intermittent rotation (counter-clockwise as seen in FIG. 5) to the ratchet shaft 54. This, in turn, imparts intermittent rotary movement to the ring gear 28 to move the sweep auger 31 slowly about the floor f of the silo.

When the sweep auger 31 encounters an area in which the material in the silo is particularly densely packed, the resulting heavy resistance to movement of the sweep arm about the silo floor produces a torsional loading of the ratchet shaft 54 which is in a clockwise direction as seen in FIG. 5. Under these circumstances, the left to right movement of the pawl 63 which ordinarily would pick up the next adjacent ratchet tooth is ineffective, because the torsional loading of the shaft 54 causes the ratchet 62 to rotate clockwise as seen in FIG. 5 so that the pawl 63 remains engaged with the same tooth of the ratchet 62 and accordingly produces no rotation of the ring gear 28. This permits the sweep auger 31 to continue to feed material until it has eliminated the dense packing and the ratchet and pawl drive can again produce intermittent rotation of the ring gear 28.

As seen in FIG. 3, the discharge auger opening 13 is provided with a closure 64 that is hinged at 65; and a pivoted bolt 66 receives a wing nut 67 so that the closure 64 may be selectively sealed against the lower end of the discharge opening 13 or released for movement about the hinge 65 to a fully open position.

The helix 16 of the discharge auger 14 is seen in FIG. 3 to terminate adjacent the inner side of the opening 13 so as to prevent it from packing material against the closed outer end of the discharge tube 12; and in order to assure flow of material from the tube 12 into the discharge opening 13, one or more radial pins 68 project from the auger shaft 14 generally above the center line of the discharge opening 13.

The foregoing detailed description is given for clearness of understanding only and no unnecessary limitations should be understood therefrom, as modifications will be obvious to those skilled in the art.

We claim:

1. In a bottom silo unloader for use in the discharge of moist grain from a sealed cylindrical silo that has a floor with a center discharge hole, in combination:

a casing in said discharge hole that has an upper edge substantially flush with the floor;

a discharge tube communicating with said casing beneath the floor, said discharge tube having a discharge opening outside the line of the silo wall and an airtight closure for said opening;

a discharge auger in said discharge tube;

drive means mounted outside the silo and drivingly connected to said discharge auger;

a lower right angle gear box in the casing which has a horizontal input shaft coupled to the discharge auger;

means at the bottom of the casing restricting movement of said lower gear box;

an upper right angle gear box having a horizontal output shaft;

a vertical shaft drivingly connecting said gear boxes;

a sweep auger above the silo floor and rigidly drivingly connected to the output shaft of the upper gear box for revolving the sweep auger on its axis to feed grain into the casing;

a ring gear supported in the upper part of the casing for rotation about the axis of the vertical shaft;

means mounting said upper gear box on said ring gear;

and means for driving the ring gear from the drive means to rotate the sweep auger about the center of the silo.

2. The combination of claim 1 in which the means for driving the ring gear includes means responsive to high resistance to rotation of the sweep auger around the silo for suspending rotation of the ring gear until the high resistance is relieved by axial revolving of the sweep auger.

3. The combination of claim 2 in which the means for driving the ring gear includes a ratchet and eccentric pawl drive outside the silo, a ratchet shaft extending from the ratchet into the casing beneath the silo floor, and means on the ratchet shaft in driving engagement with the ring gear, torsional distortion of said ratchet shaft under heavy load causing the suspension of ring gear rotation by causing the ratchet to rotate reversely as the pawl withdraws from engagement with the ratchet.

4. The combination of claim 1 which includes generally radially extending means on the vertical shaft for moving grain into the discharge auger from the portion of the casing remote from said auger.

5. The combination of claim 1 in which the discharge opening is in the bottom of the discharge tube beneath the outer end portion of the discharge auger, and in which there is a generally radially extending feed pin on the discharge auger shaft above said discharge opening.

6. The combination of claim 1 in which the drive means includes a motor and reduction gear box which has an input shaft driven from the motor, said gear box having an output shaft directly coupled to the discharge auger.

7. The combination of claim 6 in which the means for driving the ring gear includes an output member on the gear box output shaft, and means including an intermittent motion device driven from said output member.

8. The combination of claim 7 in which the intermittent motion device includes a counter shaft driven by the output member, an eccentric on said counter shaft, a pawl reciprocated by said eccentric, a ratchet which has teeth engaged by the pawl, a ratchet shaft extending from the ratchet beneath the silo floor into the casing, and means on the ratchet shaft in driving engagement with the ring gear.

9. The combination of claim 8 in which the ratchet shaft can flex torsionally when the sweep auger encounters high resistance to rotation around the silo, said torsional flexing causing the ratchet to rotate reversely as the pawl withdraws from engagement with it, whereby rotation of the ring gear is suspended until said high resistance is relieved by axial revolving of the sweep auger.

10. The combination of claim 1 in which the casing has flange means near its upper edge on which the ring gear rests, a plurality of gear confining members surmounting said flange means substantially in contact with the ring gear, and a ring gear retaining plate supported on the flange means slightly above the ring gear.

11. The combination of claim 10 in which the casing is rectangular, the flange means comprises a flange member in each corner, there is a rotatable gear confining member on each flange member, and the ring gear retaining plate rests on spacers about which the gear confining members rotate.

12. The combination of claim 1 in which the ring gear has a circumferential array of equally spaced depending studs, and the means for driving the ring gear includes a horizontal driven shaft and a worm gear on said shaft which engages said studs to rotate the ring gear.

*13. In a bottom silo unloader, the combination of a casing which sets in a discharge hole provided in the floor of a silo, a discharge tube which communicates with said casing adjacent the base thereof and has a discharge opening for location outside the line of the silo wall, a discharge auger in said discharge tube, drive means drivingly connected to said discharge auger; a lower gear box in the casing which has an input shaft coupled to the discharge auger; an upper gear box having an output shaft; a vertical shaft drivingly connecting said gear boxes such that the output shaft of the upper gear box turns on its axis with rotation of the input shaft of the lower gear box; a sweep auger to move over the silo floor which is drivingly connected to the output shaft of the upper gear box for revolving the sweep auger on its axis to feed material into the casing; a ring gear supported in the casing for rotation about the axis of the vertical shaft; the upper gear box being mounted on said ring gear to turn therewith; and means for driving the ring gear from the drive means to rotate the sweep auger over the floor of the silo about the axis of the vertical shaft.*

*14. The combination of claim 13 in which the means for driving the ring gear includes means responsive to high resistance to rotation of the sweep auger for suspending rotation of the ring gear until the high resistance is relieved by axial revolving of the sweep auger.*

* * * * *